United States Patent [19]

Avery

[11] 3,735,192

[45] May 22, 1973

[54] VERTICAL DEFLECTION CIRCUITS UTILIZING BOTH REGENERATIVE AND DEGENERATIVE FEEDBACK FOR GENERATING PARABOLIC VOLTAGES

[75] Inventor: Leslie Ronald Avery, Byfleet, England

[73] Assignee: RCA Corporation, New York, N.Y.

[22] Filed: Apr. 14, 1971

[21] Appl. No.: 133,864

[30] Foreign Application Priority Data

Apr. 22, 1970 Great Britain....................19,351/70

[52] U.S. Cl...........................................315/27 TD

[51] Int. Cl...........................................H01j 29/70

[58] Field of Search....................315/27, 27 TD, 28, 315/29

[56] References Cited

UNITED STATES PATENTS

| | | | |
|---|---|---|---|
| 3,341,716 | 9/1967 | Chilton | 315/27 TD |
| 2,964,673 | 12/1960 | Stanley | 315/27 TD |
| 3,439,221 | 4/1969 | Drummond | 315/27 TD |

*Primary Examiner*—Carl D. Quarforth
*Assistant Examiner*—J. M. Potenza
*Attorney*—Eugene M. Whitacre

[57] ABSTRACT

S-shaping is introduced into a sawtooth waveform by a combination of positive and negative feedback of separately adjustable, generally parabolic voltage waveforms so as to provide a suitable field (vertical) deflection signal for a wide deflection angle kinescope. Output and drive transistors are cut off relatively rapidly at the end of scan and are returned to conduction at the beginning of scan by coupling capacitive elements in the sawtooth generating circuit to the inputs of the transistors.

7 Claims, 1 Drawing Figure

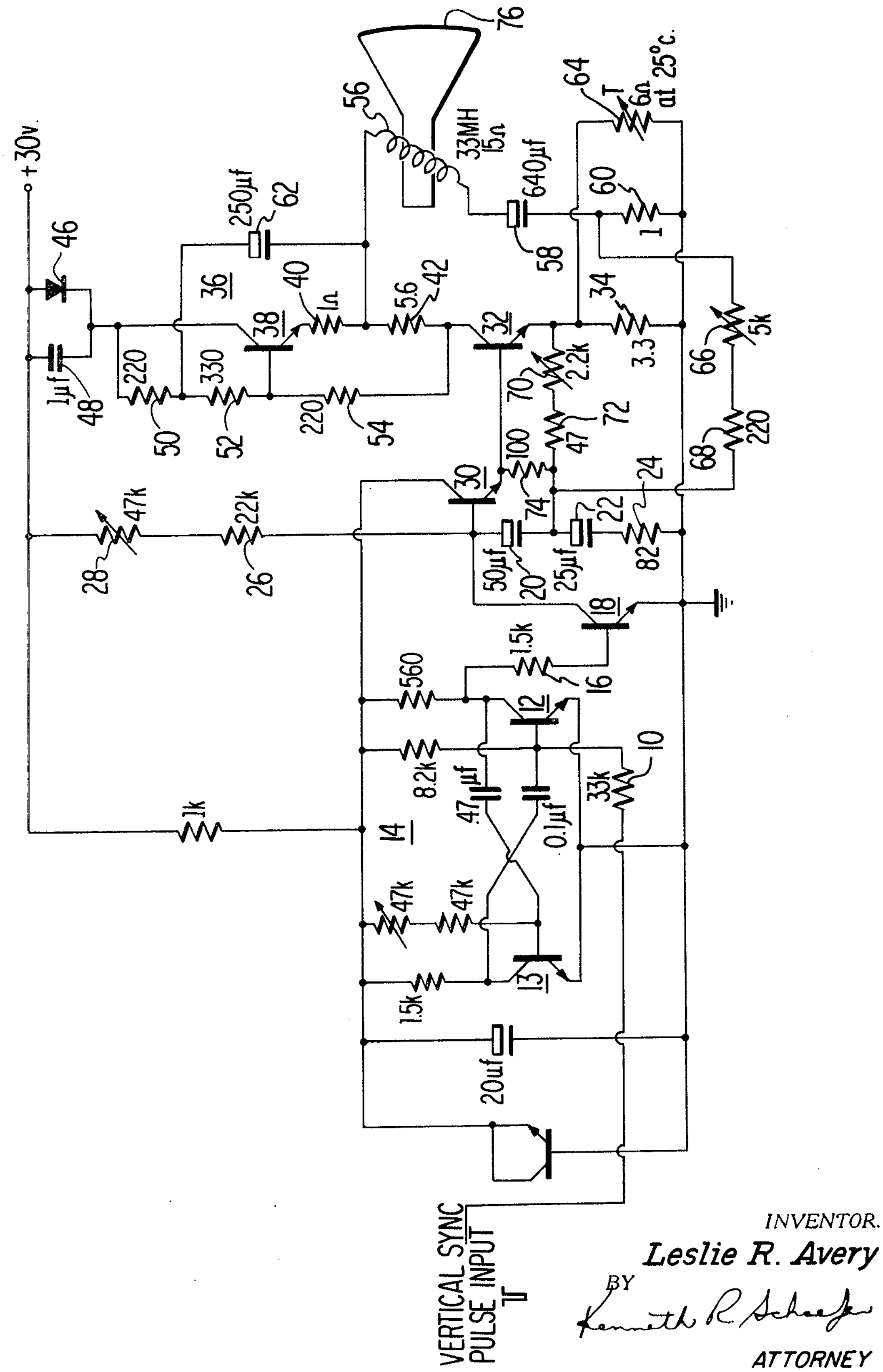
INVENTOR.
Leslie R. Avery
BY
Kenneth R. Schaefer
ATTORNEY

VERTICAL DEFLECTION CIRCUITS UTILIZING BOTH REGENERATIVE AND DEGENERATIVE FEEDBACK FOR GENERATING PARABOLIC VOLTAGES

This invention relates to electron beam deflectlon circuits and, in particular to field or vertical deflection circuits capable of providing a relatively linear scanning pattern for wide deflection angle kinescope or other devices.

Television receivers and other apparatus utilizing cathode ray image reproducing devices, employ a field scanning or vertical deflection system for supplying a sawtooth current waveform to a vertical yoke or deflection winding. The vertical deflection windings of a television receiver may be regarded as being substantially resistive during the scan or trace interval and inductive during the flyback or retrace interval. As a first approximation, therefore, in order to obtain a linear scan of the image reproducing device, a sawtooth voltage is supplied to the vertical deflection windings. Since the face of a cathode ray tube for a television receiver is not generally spherical, S-shaping of the linear trace portion of the deflection waveform is required to produce the desired linear scanning pattern. For wide deflection angle (e.g. 110°) cathode ray tubes, the S-shaping requirements are substantial and the ends of the scanning waveform must be flattened to a noticeable degree as compared to a linear waveform.

Numerous approaches to providing the desired S-shaping of the deflection waveform are known. One such approach utilizes a pair of series connected capacitors coupled by means of a relatively large resistor to a high voltage source for supplying charging current to the capacitors. A linearly varying voltage thus may be produced across such capacitors. Furthermore, a regenerative feedback arrangement is provided from an associated output amplifier to the junction of the capacitors to add a substantially parabolic voltage to the linear voltage. Some degree of S-shaping is thereby provided. Such a known circuit also employs circuit means for turning an associated driver stage off and on relatively rapidly to avoid non-linearities at the end and beginning of scan which might otherwise occur.

The present invention relates to improvements over the above-described known circuit arrangements. In accordance with one aspect of the present invention, a vertical deflection circuit comprises first and second capacitors connected in series relation to a source of relatively constant charging current. A switching device is coupled across the capacitors for periodically discharging the capacitors. A sawtooth voltage produced across the capacitors is coupled by amplifying means to a deflection coil. Linearity control and S-shaping of the sawtooth voltage is provided by a combination of regenerative and degenerative feedback coupled between the output circuit and the junction of the series connected capacitors. The feedback circuits add oppositely phased parabolically varying voltages to the sawtooth waveform to provide the required S-correction for a linear scanning pattern.

In accordance with a further aspect of the present invention, in a deflection circuit of the general type described above, the amplifying means comprises a driver transistor and an output transistor. The input of the driver transistor is coupled across the series connected capacitors. A relatively low resistance is coupled from the junction of the capacitors to the joined output of the driver and input of the output transistors to aid in rapid turn-on and turn-off of the output transistor at the beginning and end of scan, respectively.

The novel features that are considered characteristic of this invention are set forth with particularity in the appended claims. The invention itself, however, both as to its organization and method of operation as well as additional objects thereof will best be understood from the following description when read in connection with the accompanying drawing which illustrates, in the form of a schematic circuit diagram, a vertical deflection circuit for a television receiver embodying the present invention.

Referring to the drawing, vertical synchronizing pulses are applied via a resistor 10 to the base of a transistor 12 arranged, in combination with a transistor 13 and associated resistive and capacitive elements, in a multivibrator oscillator arrangement indicated generally by the reference numeral 14. The output of oscillator 14 is coupled via a resistor 16 to the base of a switching transistor 18, the emitter of which is directly connected to a reference potential (e.g. ground). A sawtooth waveform generating circuit, comprising the series combination of a variable height control resistor 28, a fixed resistor 26, first and second capacitors 20 and 22, and a "sit-up" resistor 24, is connected between a source of energizing potential ($B^+$) and ground. The collector-emitter path of switch transistor 18 is connected across the series combination of resistor 24 and capacitors 20 and 22. The junction of capacitor 20 and resistor 26 is connected to the base of an NPN driver transistor 30. The emitter of transistor 30 is, in turn, coupled to the base of an NPN output transistor 32. A relatively small valued resistor 34 for sampling current in output transistor 32 is coupled between the emitter of transistor 32 and ground. The collector of transistor 32 is supplied with operating potential from the $B^+$ voltage source via a load circuit indicated generally by the reference numeral 36. Load circuit 36 comprises a transistor 38 of like type conductivity (e.g. NPN) with respect to output transistor 32. The collector of transistor 38 is coupled to the B- supply voltage via a flyback decoupling diode 46. A resonating capacitor 48 is coupled in parallel with diode 46. Bias is supplied to the base of transistor 38 by means of the series combination of resistors 50 and 52 connected between the collector and base of transistor 38. A resistor 54 is connected between the collector of output transistor 32 and the base of load transistor 38. A series combination of resistors 40 and 42 is connected between the collector of transistor 32 and the emitter of transistor 38. A bootstrap capacitor 62 is connected from the junction of resistors 40 and 42 to the junction of resistors 50 and 52. Vertical deflection windings 56, associated with a kinescope 76 or other image reproducing device, are coupled by means of a capacitor 58 and a relatively small current sampling resistor 60 from the junction of resistors 40 and 42 to ground. A temperature compensatlng thermistor 64 thermally associated with deflection windings 56 is connected across resistor 34.

A first linearity correction network comprising the series combination of a variable resistor 70 and a fixed resistor 72 is coupled in a regenerative feedback arrangement from the emitter of output transistor 32 to the junction of capacitors 20 and 22.

In accordance with a first aspect of the present invention, a second linearity correction network comprising the series combination of a variable resistor 66 and a fixed resistor 68 is coupled in a degenerative feedback arrangement from the junction of capacitor 58 and resistor 60 to the junction of capacitors 20 and 22.

In accordance with a second aspect of the present invention, a load resistor 74 is coupled between the emitter of driver transistor 30 and the junction of capacitors 20 and 22.

In the operation of the illustrated circuit, the basic sawtooth voltage waveform to be applied across deflection windings 56 is obtained by charging capacitors 20 and 22 via resistors 26 and 28 during the scan or trace period and discharging these capacitors 20, 22 via switching transistor 18 during the retrace period. Specifically, at the beginning of the scan interval, transistor 32 is in a cutoff condition and, as will appear below, preferably is at the verge of conduction. At the same time, load transistor 38, by virtue of the biasing provided by resistors 50, 52, 54, 40 and capacitor 62, is in a conducting condition and supplies maximum current into deflection windings 56. Transistor 12 conducts heavily (i.e. saturation conduction) so that switching transistor 18 is cut off. Capacitors 20 and 22 charge via resistors 26 and 28 so as to produce a substantially linearly increasing voltage at the base of driver transistor 30. This voltage waveform is coupled via transistor 30 to the base of output transistor 32. As the voltage waveform increases, collector current of transistor 32 progressively increases and a voltage is developed across each of resistors 42 and 34. The voltage across resistor 42 is of a polarity to gradually decrease conduction of transistor 38 as conduction of transistor 32 increases. Current in deflection windings 56 therefore decreases until the emitter current of transistor 38 is substantially equal to the collector current of transistor 32. The current in transistor 32 then continues to increase, causing current to flow out of deflection windings 56. At the end of the scan interval, transistor 38 is substantially cut off while transistor 32 is fully conducting. It should be noted that charge is stored on capacitor 58 during the first half of scan and, during the second half of scan, capacitor 58 discharges to provide the additional current for transistor 32.

Upon the application of negative-going vertical synchronizing pulses to the base of transistor 12, oscillator 14 changes state and transistor switch 18 is abruptly turned on. Capacitors 20 and 22 discharge via transistor 18 and resistor 24, causing driver transistor 30 and output transistor 32 to cease conduction. Since current ceases to flow in resistor 42, transistor 38 reverts to a conductive state. Current in the deflection windings 56 declines rapidly and the voltage across deflection windings 56 rapidly increases in a positive sense. When the voltage across deflection windings 56 increases sufficiently (i.e. approximately to the $B^+$ voltage), diode 46 will become reverse biased and open. The voltage across deflection windings 56 then varies in a half-sinusoidal manner according to the resonant period of deflection windings 56 and capacitor 48. When the voltage across diode 46 again declines to a value to permit conduction of diode 46 (approximately $B^+$), a clamping period will occur until the current in deflection windings 56 is fully reversed. Energy is supplied to the deflection windings 56 from the capacitor 58 during this clamping period so as to restore losses in the circuit. At the end of the retrace period, the multivibrator 14 changes state, switching transistor 18 is cut off and the cycle repeats. It should be noted that inclusion of the resistor 24 causes a forward bias to appear at the start of scan at the bases of transistors 30 and 32. This "sit-up" voltage permits transistors 30 and 32 to begin conduction substantially at the beginning of scan thereby preventing "cramping" or non-linearity of the scan at the top of the picture.

The deflection current produced in deflection windings 56 by a rudimentary circuit of the type described above is known to produce a non-linear scanning pattern on large screen or wide deflection angle kinescope. For example, where a wide deflection angle (110°) kinescope is used, it is necessary to provide "S" connection to the sawtooth voltage applied to deflection windings 56 to achieve a linear scanning pattern. That is, the rate of change of the voltage across (or current through) the scan coils must be reduced at the start and end of scan. A known approach to providing at least a portion of the desired S-correction involves the use of the regenerative (positive) feedback network including resistors 70 and 72 coupled from the emitter of output transistors 32 to the junction of capacitors 20 and 22. Resistors 70 and 72, in conjunction with capacitor 22 form an integrating network. Resistor 34 samples the current in output transistor 32 and applies a corresponding voltage to the integrating network 70, 72, 22. The sawtooth current at the emitter of transistor 32 is therefore converted to a parabola of voltage across capacitor 22 which is added to the sawtooth voltage at the base of driver transistor 30. The image produced on kinescope 76 is therefore compressed at the beginning of scan, thereby improving linearity. However, the bottom of the image (end of scan) is slightly expanded. While the latter effect has been avoided in some previous deflection arrangements by inductively coupling the deflection windings to the output terminal, such an approach is undesirably costly.

In accordance with one aspect of the present invention, a second feedback circuit, arranged to provide degenerative (negative) feedback, is also coupled to the junction of capacitors 20 and 22. Resistor 60, which is in series with the deflection windings 56, provides a sawtooth voltage of opposite sense to that appearing across resistor 34. An integrating network comprising resistors 66, 68 and capacitor 22 causes an oppositely phased parabolic voltage to be added to the sawtooth plus parabola at the base of transistor 30. The amplitude of the second parabola can be controlled by varying resistor 66 while the amplitude of the first parabola can be controlled by means of resistor 70. The phase or sense of the second parabola is such that the desired decrease of scan current at the end of scan (picture bottom) may be provided. Thus, a top linearity control (resistor 70) and a bottom linearity control (resistor 66) are provided.

In circuits of the previously employed type described above as including a single linearity control, emitter follower driver transistors have been used. That is, either an NPN or PNP driver transistor having an emitter resistor returned to ground, or to the $B^+$supply, respectively, have been employed. In such a configuration, turn-off of transistor 32 is dependent upon the exponential decay rate of capacitors 20 and 22. The length of the retract time, as well as linearity of scan immediately before and/or after retrace may be undesirably affected in such a configuration. Furthermore, the emitter follower driver load resistor would appear across the base-emitter circuit of output transistor 32. Transistor 32 is subjected to a relatively large collector-emitter voltage during retrace and the device employed would have to be selected according to its $V_{cer}$ (collector-emitter breakdown voltage with resistor between base and emitter) rating. As is well known, a given transistor is able to withstand a greater collector-emitter voltage where a reverse voltage is applied between base and emitter as compared to the condition where a resistor is connected between base and emitter (i.e. $V_{cev} > V_{cer}$, see RCA Transistor Manual, Technical series SC-13 published by RCA Corporation, Harrison, New Jersey).

In accordance with a further aspect of the present invention, the resistor 74 associated with the driver transistor 30 is returned to the junction of capacitors 20 and 22. Thus, when switching transistor 18 is turned on to initiate retrace, the voltage at the base of transistor 30 is clamped essentially to ground (i.e. to the saturation voltage of transistor 18 which typically is of the order of a fraction of a volt). Since capacitors 20 and 22 were charged to positive voltage levels during the trace period relative to ground, and since resistor 24 is returned to ground, the junction of capacitors 20 and 22 rapidly changes to a negative voltage level when transistor 18 is turned on. This negative voltage transition is coupled to the base of transistor 32, causing it to turn off rapidly. A negative voltage is maintained between base and emitter of transistor 32 substantially throughout the retract period as capacitors 20 and 22 discharge. The transistor 32 therefore may be selected according to its $V_{cev}$ rating. Transistor 32 is turned off rapidly during retrace and is returned to conduction relatively rapidly at the beginning of trace, thereby providing the desired linear scanning pattern on kinescope 76.

While one embodiment of the present invention has been described, it will be apparent that various modifications may be made within the scope of the present invention. For example, the deflection windings 56 may be coupled to the output transistor 32 in a different manner. The load circuit 36 may employ different circuit elements. Consistent with the above, the negative feedback signal may be derived from other components in the output circuit. Oscillator arrangements other than multIvibrator 14 also may be employed as is known in the art.

What is claimed is;

1. A deflection circuit comprising:
first and second series connected capacitors;
means for supplying a relatively constant current to said capacitors to produce a substantially linearly varying voltage across said capacitors;
means coupled across said capacitors for periodically discharging said capacitors;
an output circuit comprising a deflection coil and amplifying means for coupling time-varying voltages produced across said capacitors to said deflection coil;
regenerative feedback means coupled from said output circuit to the junction of said first and second capacitors for adding a first substantially parabolically varying voltage to said linearly varying voltage; and
degenerative feedback means coupled from said output circuit to the junction of said first and second capacitors for adding to said linearly varying voltage a second substantially parabolically varying voltage of opposite phase with respect to said first parabolically varying voltage.

2. A deflection circuit according to claim 1 wherein:
each of said regenerative and degenerative feedback means comprises a variable resistance for separately varying said first and second parabolically varying voltages, respectively.

3. A deflection circuit according to claim 1 wherein:
said degenerative feedback means comprises a first variable resistance for varying said second parabolically varying voltage.

4. A deflection circuit according to claim 3 wherein:
said degenerative feedback means further comprises resistive means connected in series with said deflection coil for sampling current in said deflection coil.

5. A deflection circuit according to claim 4 wherein:
said amplifying means comprising an output transistor coupled in a common emitter configuration for supplying said time-varying voltages to said deflection coil; and
second resistive means coupled to said output transistor for sampling current in said output transistor; said second resistive means being coupled to said regenerative feedback means.

6. A deflection circuit comprising:
first and second series-connected capacitors;
means for supplying a relatively constant current to said capacitors to produce a substantially linearly varying voltage across said capacitors;
means coupled across said capacitors for periodically discharging said capacitors;
an output circuit comprising a deflection coil and amplifying means for coupling time-varying voltages produced across said capacitors to said deflection coil, said amplifying means comprising at least a driver transistor having an input coupled to said capacitors, an output transistor having an input coupled to said driver transistor and an output coupled to said coil, and a relatively low resistance element coupled from the junction of said capacitors to the input of said output transistor;
regenerative feedback means coupled from said output circuit to the junction of said first and second capacitors for adding a first substantially parabolically varying voltage to said linearly varying voltage; and
degenerative feedback means coupled from said output circuit to the junction of said first and second capacitors for adding to said linearly varying voltage a second substantially parabolically varying voltage of opposite phase with respect to said first parabolically varying voltage.

7. A deflection circuit according to claim 6 wherein:
each of said regenerative and degenerative feedback means comprises a variable resistance for separately varying said first and second parabolically varying voltages, respectively.

* * * * *

Disclaimer

3,735,192.—*Leslie Ronald Avery,* Byfleet, England VERTICAL DEFLECTION CIRCUITS UTILIZING BOTH REGENERATIVE AND DEGENERATIVE FEEDBACK FOR GENERATING PARABOLIC VOLTAGES. Patent dated May 22, 1973. Disclaimer filed Jan. 14, 1981, by the assignee, *RCA Corp.*

Hereby enters this disclaimer to claims 1, 2 and 3 of said patent.

[*Official Gazette April 7, 1981.*]